June 12, 1956 A. L. SAMUEL 2,750,532

CATHODE-RAY DEVICES, PARTICULARLY FOR ELECTRONIC COMPUTERS

Filed June 3, 1948 8 Sheets-Sheet 1

Inventor:
Arthur L. Samuel,
By Chritton, Schroeder,
Merriam & Hofgren, Attys.

Inventor:
Arthur L. Samuel,
By Chritton, Schroeder,
Merriam & Hofgren, Attys.

Inventor:
Arthur L. Samuel,
By Chritton, Schroeder,
Merriam & Hofgren, Attys.

June 12, 1956 A. L. SAMUEL 2,750,532

CATHODE-RAY DEVICES, PARTICULARLY FOR ELECTRONIC COMPUTERS

Filed June 3, 1948 8 Sheets-Sheet 4

Inventor:
Arthur L. Samuel,
By Christton, Schroeder,
Merriam, Hofgren, Attys.

CATHODE-RAY DEVICES, PARTICULARLY FOR ELECTRONIC COMPUTERS

Filed June 3, 1948 8 Sheets-Sheet 5

Inventor:
Arthur L. Samuel,
By Chritton, Schroeder, Merriam & Hofgren, Attys.

CATHODE-RAY DEVICES, PARTICULARLY FOR ELECTRONIC COMPUTERS

Filed June 3, 1948 8 Sheets-Sheet 6

Inventor:
Arthur L. Samuel,
By Chritton, Schroeder,
Merriam & Hofgren, Attys.

June 12, 1956 A. L. SAMUEL 2,750,532

CATHODE-RAY DEVICES, PARTICULARLY FOR ELECTRONIC COMPUTERS

Filed June 3, 1948 8 Sheets-Sheet 7

Inventor:
Arthur L. Samuel,
By Chritton, Schroeder,
Merriam & Hofgren, Attys.

CATHODE-RAY DEVICES, PARTICULARLY FOR ELECTRONIC COMPUTERS

Filed June 3, 1948

Inventor:
Arthur L. Samuel,
By Chritton, Schroeder,
Merriam & Hofgren, Attys.

2,750,532

CATHODE-RAY DEVICES, PARTICULARLY FOR ELECTRONIC COMPUTERS

Arthur L. Samuel, Urbana, Ill., assignor, by direct and mesne assignments, to International Business Machines Corporation, New York, N. Y.

Application June 3, 1948, Serial No. 30,826

18 Claims. (Cl. 315—8.6)

This invention relates to cathode ray devices, particularly for electronic computers.

Cathode ray devices may be made having a plurality of target areas for a given operative purpose, as for example the storing and subsequent reproduction of information provided by a certain potential on the target area. I have devised and am here disclosing an arrangement enabling the use of a large number of target areas in a cathode ray tube for any desired operative purpose with accurate control of location of the cathode ray beam on such area when desired. Such apparatus is particularly useful, for example, in the memory unit of a high speed electronic computer.

One modern electronic computer employs a memory unit utilizing mechanical waves in a column or pool of mercury, with appropriate means for maintaining such waves and for rendering the information contained therein available to the arithmetic unit or other appropriate portions of the machine. The capacity of such a memory unit is relatively quite limited, however, and such machines usually require a separation of memory functions into what are generally termed internal and external memories. The computer can at any given instant utilize only such information as is present in the internal memory, and large amounts of information must be moved from the internal memory to the external memory and at some later time returned to the internal memory, with attendant delay and possible inaccuracy, to render it again readily available for use in the computing operations.

While my invention is concerned with cathode ray devices that are useable for other operative functions than the storing and reproduction of information, and no limitations to such function are intended except where so stated, I have developed the improvements here being disclosed particularly for the memory unit of an electronic computer, and such a unit will be hereinafter described as a preferred embodiment of my inventions.

My present inventions obviate any need of an external memory and provide a single memory unit which can have a very large storage capacity, which has all stored information available to the computer immediately, and which provides an extremely high degree of accuracy in the storing and later reproduction of information.

Figure 1:
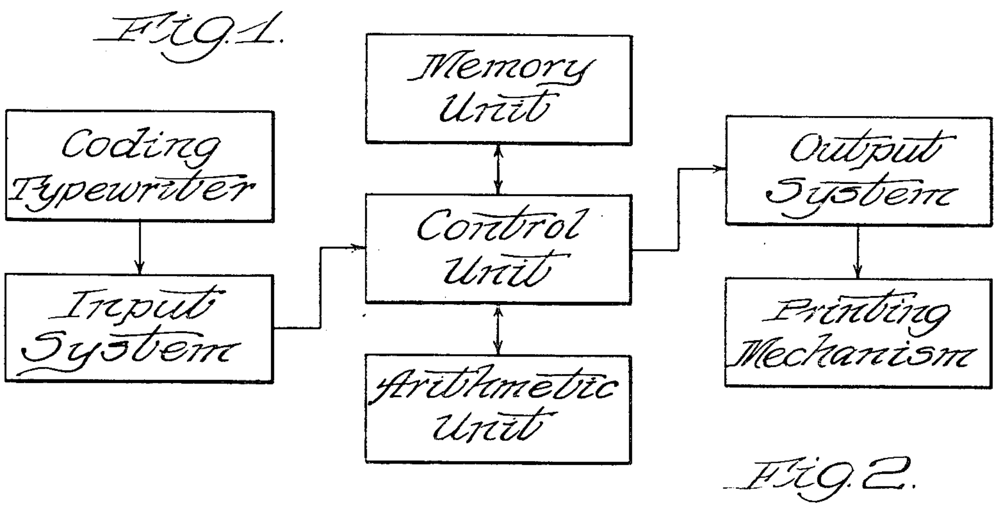
Figure 2:
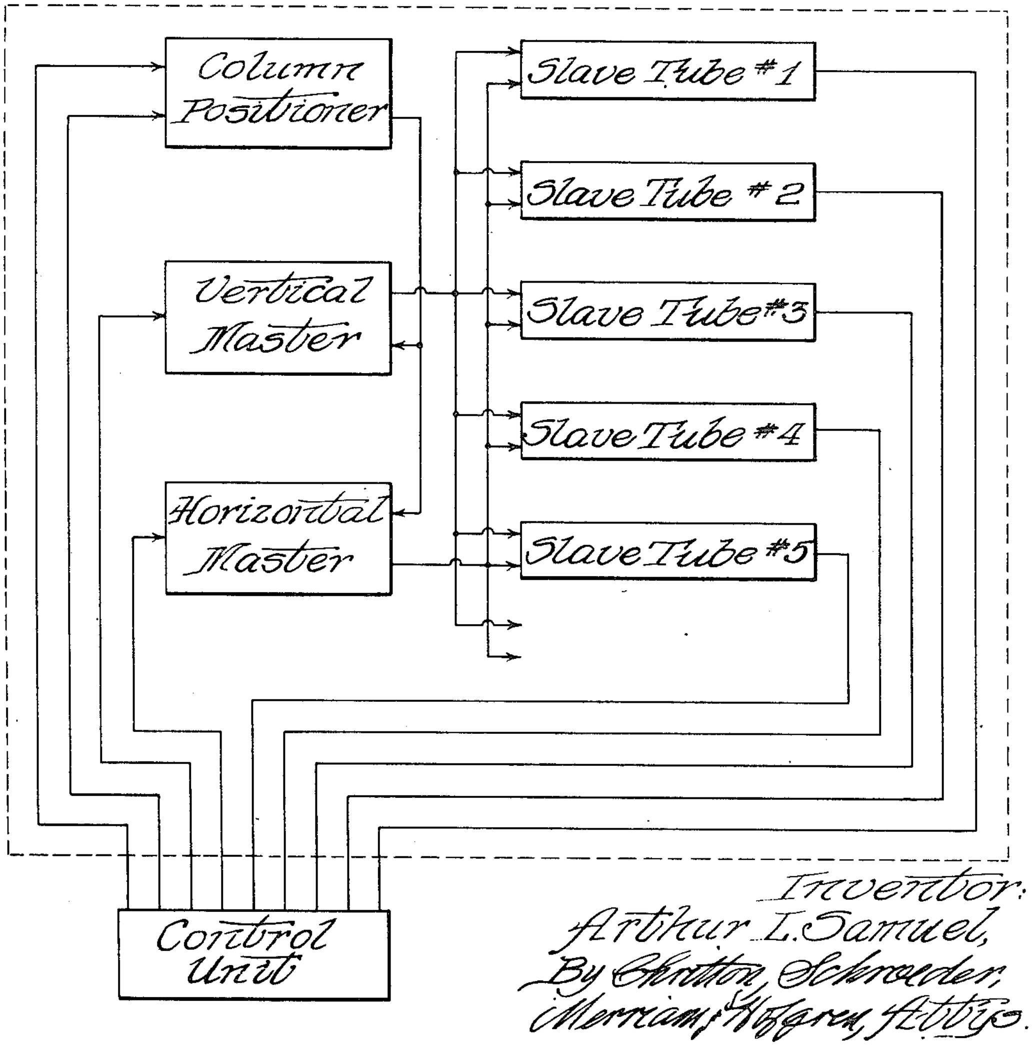
Figure 3:
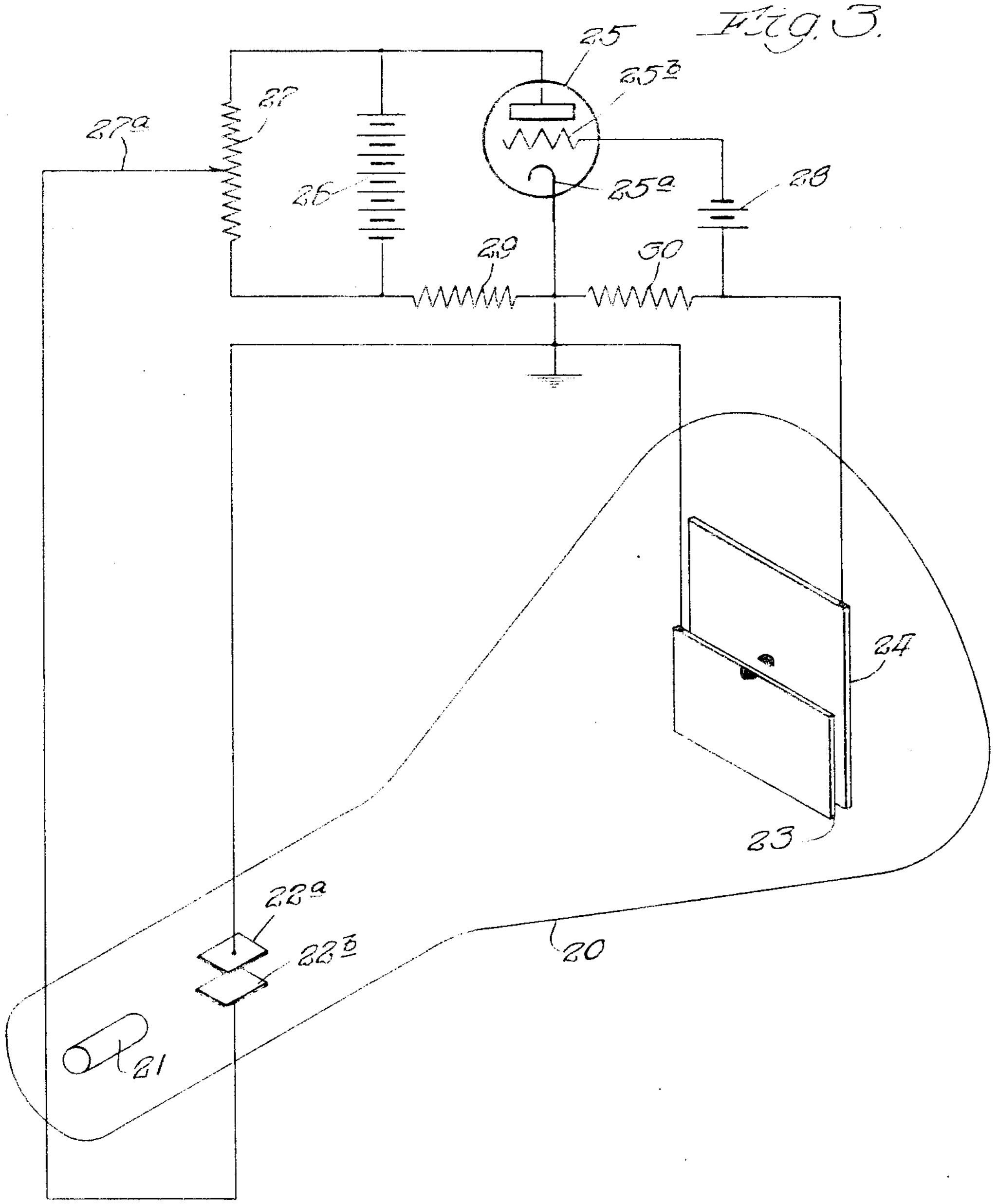
Figure 4:
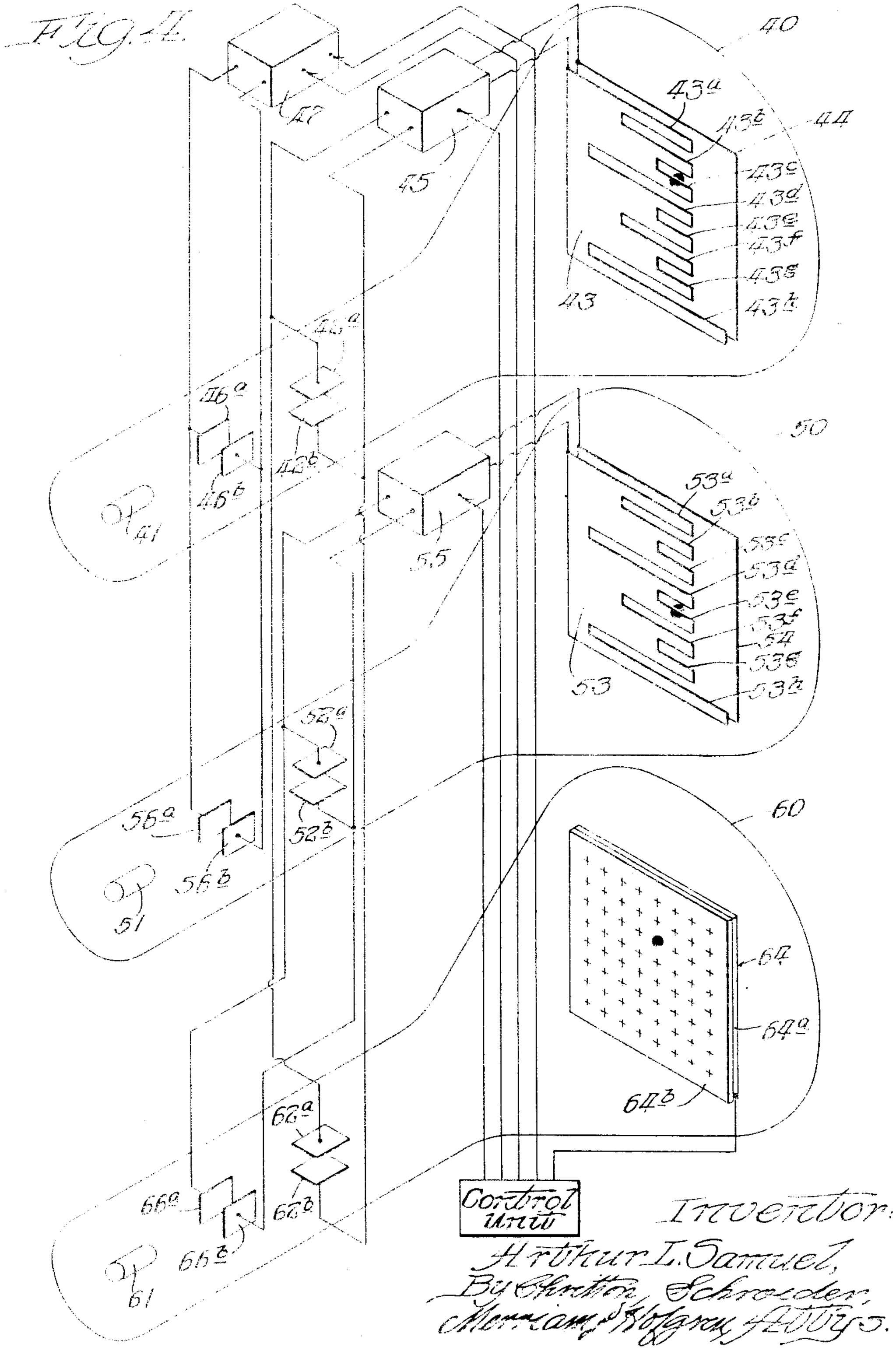
Figure 5:
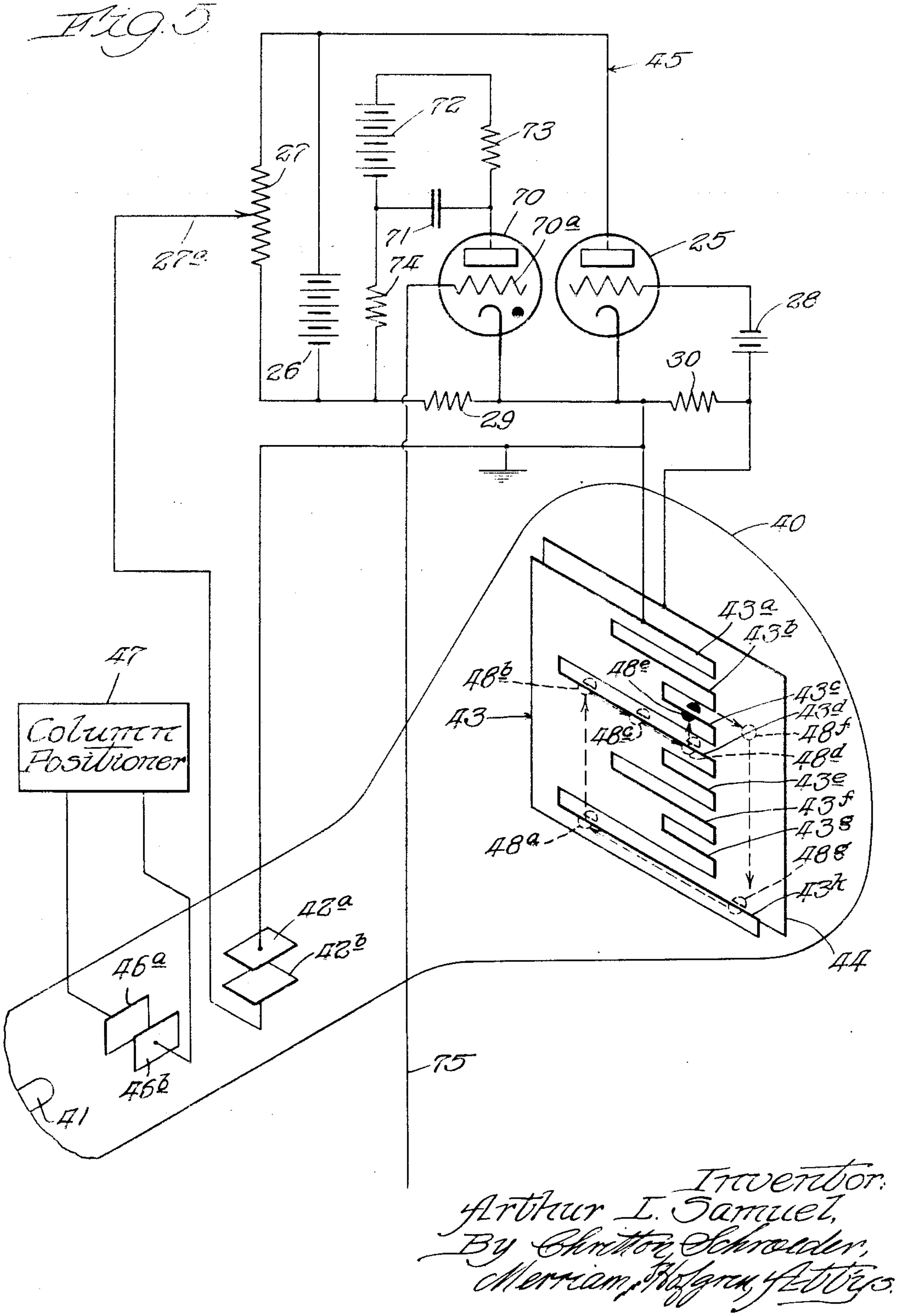
Figure 6:
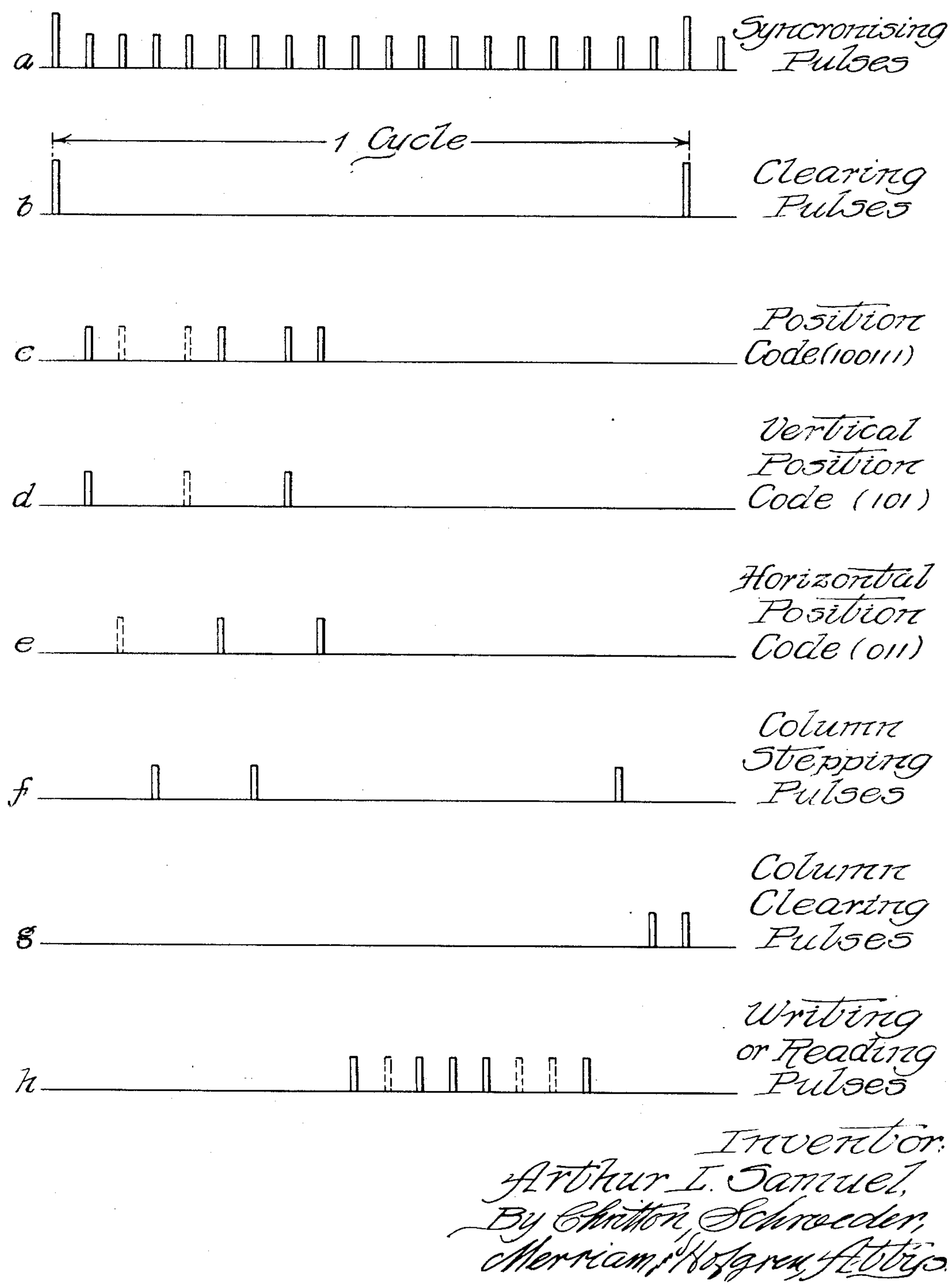
Figures 7, 8:
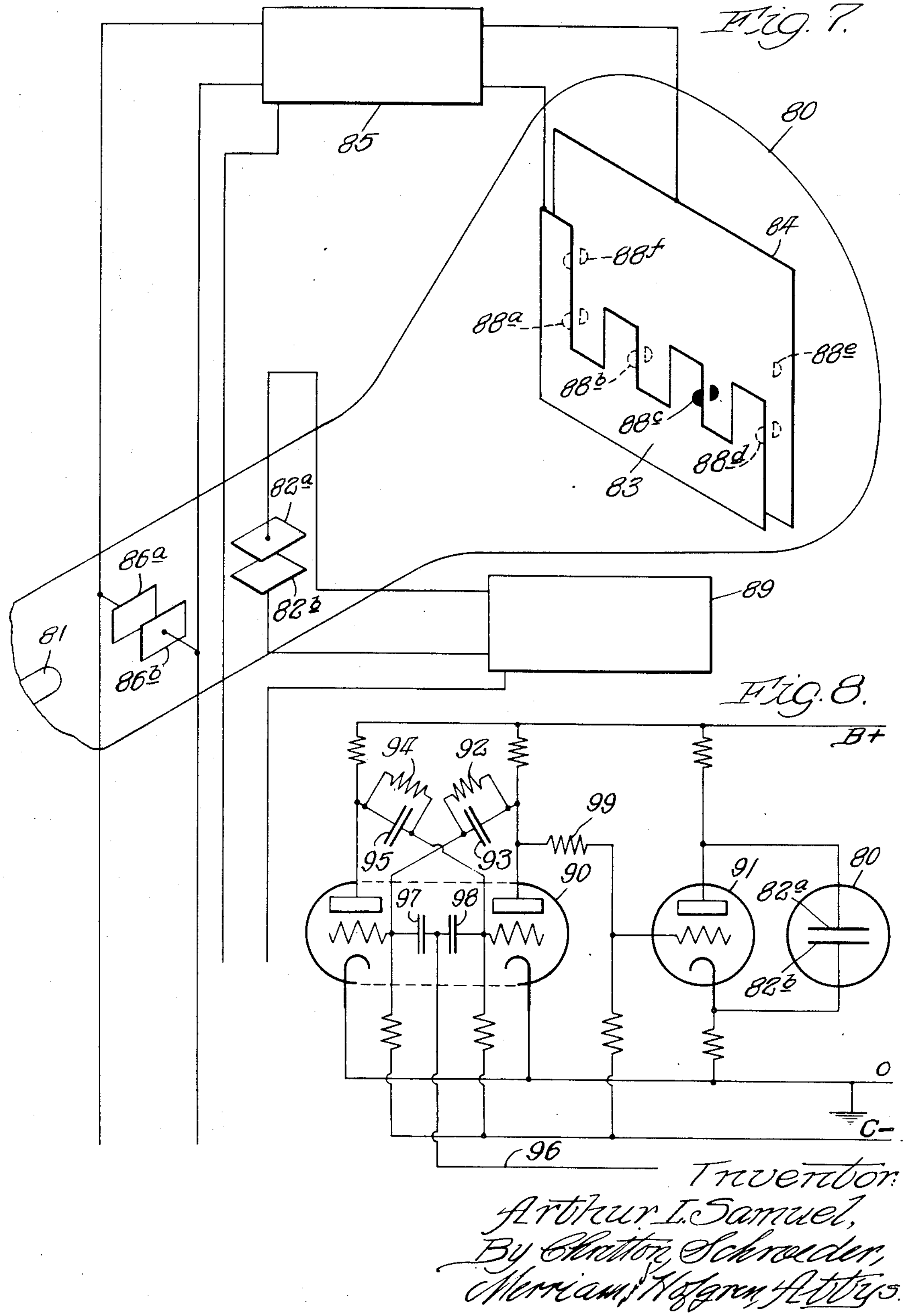
Figures 9, 10:
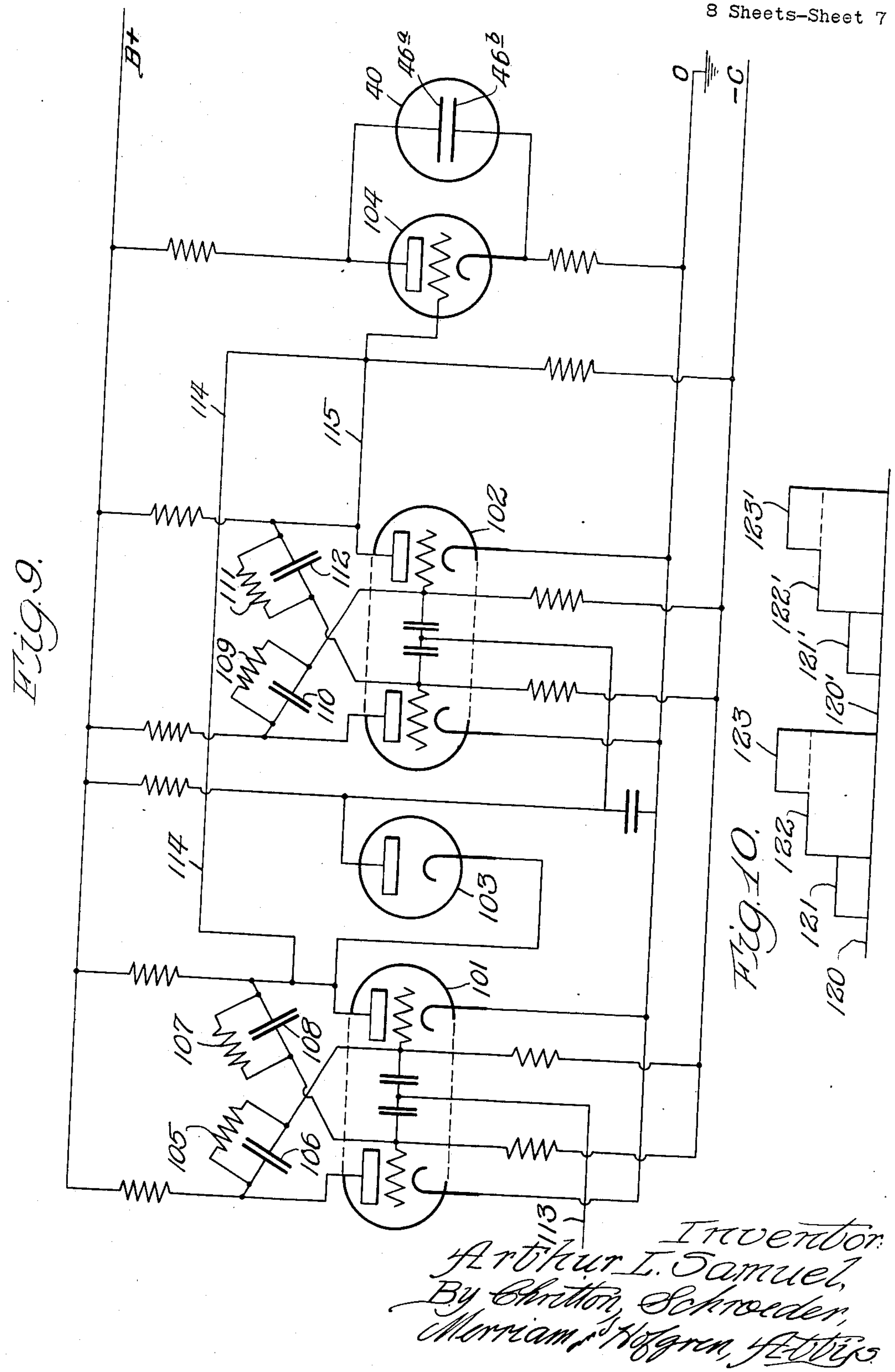
Figures 11, 12:
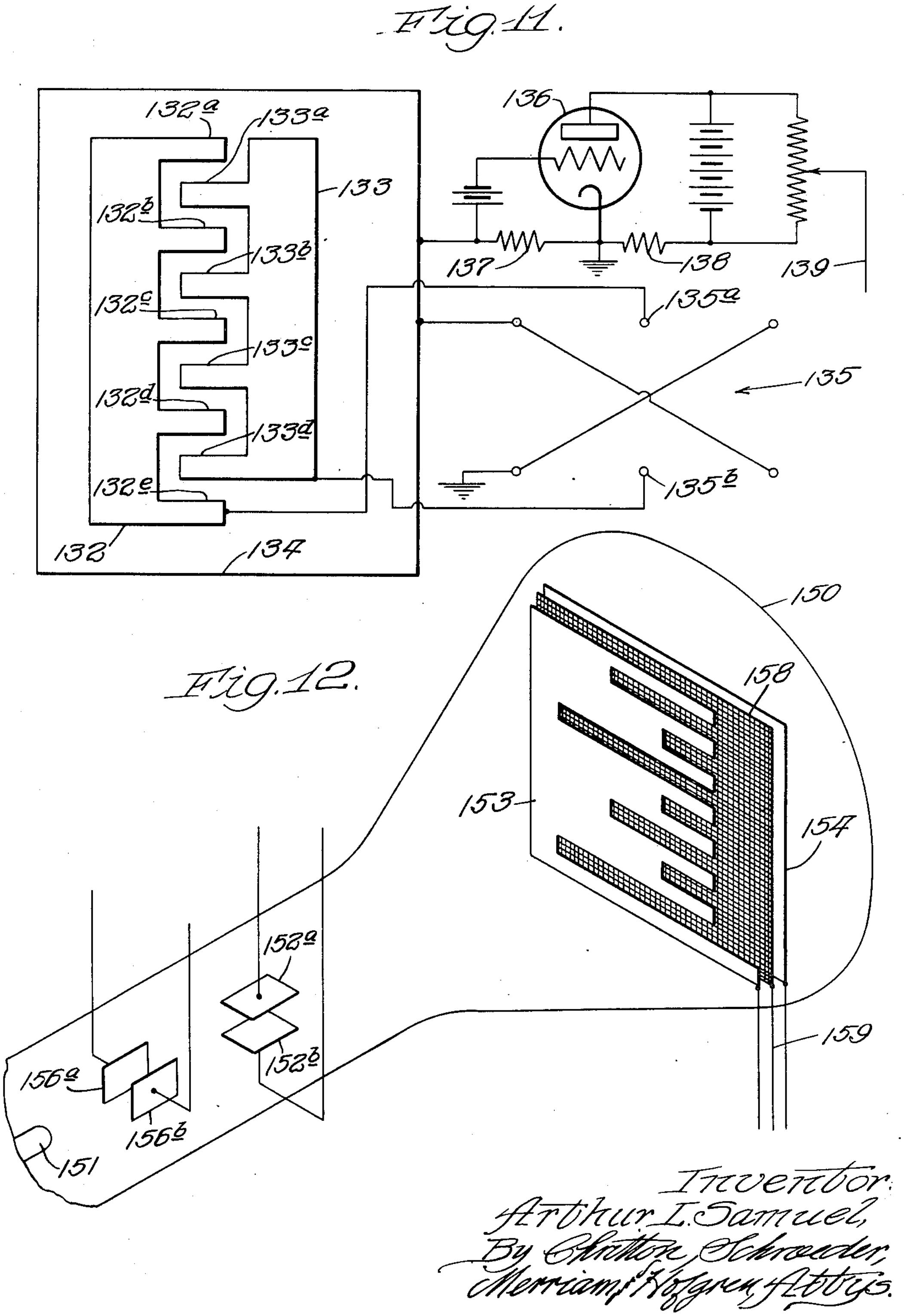

The foregoing and other features of my inventions will be apparent from the following specification and the drawings, in which:

Figure 1 is a simplified block diagram illustrative of an electronic computer in which my inventions may be utilized; Figure 2 is a somewhat amplified block diagram particularly concerned with the memory unit of such a computer; Figure 3 is a view of a cathode ray device and associated circuits which, in simplified form, embody certain of the basic principles of my inventions; Figure 4 is a view, partly in perspective and partly in block diagram form, of an operative cathode ray device, an information storing and reproducing tube in this case, together with control arrangements for causing the ra beam to strike a predetermined target with considerab precision; Figure 5 is a view of one of the control a rangements shown in Figure 4, comprising a circuit : association with a cathode ray tube; Figure 6 is an i lustrative view of a representative group of pulses illu trated to enable better description of the operation ‹ the device; Figure 7 is a view of a column position which may be used in my apparatus, with the circu associated with the cathode ray tube being shown in blo diagram form; Figure 8 is a circuit of a character us able for vertical positioning of the beam in the arrang ment shown in Figure 7; Figure 9 is a circuit diagra of an alternative column positioner which may be us in place of that illustrated in Figure 7; Figure 10 is voltage chart illustrative of the operation of the column p sitioner circuit shown in Figure 9; Figure 11 is a schemat illustration of an alternative beam control arrangemer and Figure 12 is a perspective view of a modified for of a cathode ray control device.

The binary system of computing is particularly sui able for an electronic computer, since that system ope ates entirely from what may be termed "on" and "of indications, and small differences in the absolute val do not affect the accuracy of final results as they wou in computations operating from a continuously variab function. For convenience of designation informatic is generally expressed in the binary system in combin tions or sequences (generally termed "words") of digi which are either zero or one. In this system, develop on the base 2 instead of the more common base 10, 1 represented by 1, 2 by 10, 3 by 11, 4 by 100, 5 by 10 6 by 110, 7 by 111, 8 by 1000, etc. All of the norm arithmetic operations of adding, subtracting, multipl ing and dividing, either with whole numbers or fra tions or both, can be conveniently handled by this sy tem of notation. Further explanations of the binary sy tem of notation, and of computations with it, may desired be had by reference to "Elementary Numb Theory" by Uspenski and Heaslet, "Arithmetic Excu sions" by H. A. Merrill, or other works.

In a high speed electronic computer information ‹ a desired character, which may be initially supplied t the machine or which may be the result of computatio by the machine, is at least temporarily stored in a men ory unit. In order for an electronic computer to rea ize its high speed potentialities this information must t capable of being stored or reproduced (or "written" ‹ "read," as it is sometimes termed) at high speed as neede in the course of the computations. A particular ele tronic computer now known in the art, using a mercu column as part of its memory system, is designed t store 1,024 words of 44 binary digits each. The sto age system which I am here disclosing for a memo unit provides possibilities of being able to store up t the neighborhood of 1,000,000 words, with a storag capacity of 4,096 words being readily and immediatel achievable with equipment components now availabl I perform the storage operation by providing a numb of storage tubes equal to the number of binary digits t be stored, and utilizing a number of storage areas (or i cremental areas, properly speaking) in each tube equ to the number of words desired to be stored.

Each storage tube may comprise a cathode ray tut with a target having a dielectric surface adapted to sto charges thereon at various areas. If a cathode ray bea having a diameter of the order of 1 millimeter is use storage areas about 2½ millimeters square are sufficie when the beam location is precisely controlled, as t means hereinafter described. Cathode ray tubes of mo erate diameter, as 7 or 8 inches, provide sufficient targ space to provide the 4,096 target areas mentioned heretofore. Increased storage capacity can be obtained by using tubes of greater diameter, or by providing several sets of tubes, or both.

Storage of information on dielectric target areas in a cathode ray device has been heretofore used to store television pictures and other patterns and traces. Reference may be had, for example, to an article entitled "A memory tube" by A. V. Haeff in Electronics for September 1947. Such tubes have heretofore, to the best of my knowledge, been unsatisfactory for computers because there was no certainty that the cathode ray beam could always be returned precisely to the same target area when desired. Occasional failure to properly return to a given target area would be of little moment in the reproduction of a television picture or oscilloscope trace, at least under most conditions, but would be ruinous to the accuracy of a computer. Another effort to use a cathode ray tube for information storage purposes has involved a large number of wires in the head or target end of the tube, presenting many complications, particularly in the matter of construction and of limitation on total storage capacity. My system obviates these and other difficulties.

Referring now more particularly to the drawings and to the system illustrated in Figures 1 to 8 thereof, I will first briefly describe the general arrangement and operation of an electronic computer of the type to which my inventions are particularly adaptable, to provide sufficient description of the environment in which my improvements may be used, and will then describe the basic principle of operation of my positioning control and an operative memory unit or system incorporating my improvements.

Referring first to Figure 1, the major sections or portions of an electronic computer are indicated in block diagram form with appropriate legends. Information necessary for the operation of the computer would be first converted into mechanical form by a coding typewriter or the equivalent, the coded tape then being supplied to an input system which would normally comprise a transcriber for converting the information on the coded tape into a form in which it might be utilized at much higher speed, as for example a magnetized wire or tape, and an input mechanism proper which provides the machine with the desired data and with information as to what the machine is to do with it. This information is all fed into a complicated control unit adapted to deliver information to the memory unit and when desired, to receive information from the memory unit for delivery to the arithmetic unit or the output system. The arithmetic unit, while spoken of in the singular, will be understood to comprise sections performing any desired arithmetic operations. At appropriate times information from the memory unit or the arithmetic unit or both is delivered to the output system where conversion from a high speed mechanical recording to a relatively lower speed mechanical recording may be made if desired, and the latter used to provide a permanent record, as by actuating a printing mechanism. Such electronic computers normally include checking means for checking upon the accuracy of the computations, as by additional and different but related "words" carried along, and may include means for periodically recording information at any given stage of the operations so that earlier satisfactory portions of the computations are not lost if an error occurs. Since the operations and construction of these electronic computers are known to the art, and since details of other portions of such computers are not necessary to an understanding of my present inventions, this specification will be hereafter directed to the memory unit and its components.

Referring now more particularly to Figure 2, the portion of the block diagram within the dotted line rectangle comprises a diagrammatic showing of a memory unit embodying my inventions, but with only a portion of the operative or storage tubes being shown. In a complete memory unit there would be a storage tube, here sometimes termed a "slave tube," for each binary digit of the desired "word" length, as for example 44 such tubes, 5 being shown in the diagram. These tubes would be identical with each other, insofar as normal manufacturing procedures permit, and would have their beam deflecting characteristics substantially identical with similar tubes used for at least vertical and horizontal master control actions. These master or control tubes would include arrangements sensitive to beam position and associated with control circuits, as will hereinafter be more fully described, in such a manner as to provide deflecting energy to the slave tubes. The vertical master, for example, might control beam deflection vertically in all of the slave tubes, while the horizontal master might control horizontal deflection in all of the slave or storage tubes. When "vertical" and "horizontal" deflections are spoken of, it is to be understood that these terms are merely used in the broad sense of control of deflection on two different ordinates, the terms "vertical" and "horizontal" being used merely for convenience of expression but it being intended that any control of deflection on two different ordinates be comprised within the action of the system and the meaning of these terms, regardless of whether it be vertical and horizontal in an absolute sense.

While the beam position in each of the slave tubes may not correspond exactly with each other, it is to be understood that this is not necessary and that the important consideration is the ability to have the beam in each slave tube return to a given area upon a given signal, with precision, and with no interference between storage areas in each tube. My control arrangements provide for the precision return of the cathode ray beam in any slave tube to any predetermined target area which may have had a given potential set up thereon by initial "writing" or storage action, regardless of the fact that there may be some minor irregularities of pattern between the different slave tubes. In order to provide improved speed of operation in the master or control units I prefer to use what I term a bifurcating system of locating different beam positions in the master tubes, and to utilize this I associate with these tubes a column positioner control arrangement which controls the position of the beam in the master tubes as between certain parallel paths of movement which I am here terming "columns."

As is indicated by the lines to the left of the column positioner and vertical and horizontal master units in Figure 2, control information in desired form, preferably pulses, is fed to these units from the control unit; and the column positioner coacts with the vertical and horizontal masters to provide control energy to the deflecting arrangements in the slave tubes to bring their ray beams precisely to predetermined corresponding target areas. If this is done during the storing of information, such information comes from the control unit through the leads indicated to the right of the slave tubes to bring the selected storage area in each tube to one of two given polarities representative respectively of "zero" and "one" in the binary system, for example; and if the beam positions have been achieved for reading previously stored information, voltages representative of the desired information return through these leads to the control unit to be delivered to the arithmetic unit or to the output, as may be indicated by the control action.

Precise beam location in the slave tubes is effected in the embodiment here illustrated and described by separate vertical and horizontal master control arrangements. The basic principle of operation of my master controls may be best understood from the simplified illustration of Figure 3, to which reference will now be made. The cathode ray device is illustrated in simplified form as comprising a tube envelope 20, a schematically illustrated cathode indicated as 21 and a pair of vertical deflection plates 22*a* and 22*b*. A beam of electrons from the cathode focused and projected in conventional manner is adapted to pass between the deflection plates 22 and travel toward the other end of the tube, to the right in Fig. 3. Precise control of the vertical position of the beam is effected by the action of plates provided at the target end of the tube in combination with an amplifier arrangement providing deflecting voltages on the plates 22. The plates are here shown as comprising a front or intercepter plate 23 and a rear or control plate 24, both of these plates being of conductive material. The amplifier circuit associated with these control plates is here shown in simplified form as consisting of a three element tube 25, which might for example be a 6J5. Plate voltage for the tube may be supplied from any conventional source here diagrammatically indicated as the battery 26, which might for example provide 150 volts and which is shown shunted by a potentiometer here identified as 27. The intercepter plate 23 is connected to the cathode 25*a* of the tube 25, to the upper plate 22*a* of the pair of vertical deflection plates in the tube 20, and to ground or cathode potential. The other deflection plate 22*b* is connected to the movable contact 27*a* of the potentiometer. A predetermined but adjustable grid bias is provided on the grid of the tube by means here indicated as a C battery 28, and resistors 29 and 30 are provided in the plate and grid circuits, respectively. The potentiometer would be so adjusted, in the absence of any current flow in the resistor 30, as to cause the beam to be deflected upwardly at some moderate space current flow through the tube 25. The grid bias on the tube 25 would be adjusted to provide this moderate or normal space current flow through the tube, and this current flow would cause a voltage drop across the resistor 29 which would oppose the voltage provided by the potentiometer 27 insofar as the beam deflecting arrangement is concerned. With no current flow through the resistor 30, adjustments would be such that the voltage drop across that portion of the potentiometer 27 which is effective on the deflector plate 22*b*, less the voltage drop across the resistor 29, would be sufficient to swing the beam above the positioning edge at the top of the intercepter plate 23.

For example, a deflection voltage of 100 volts might be available across the lower part of the potentiometer 27, and the tube current might be so adjusted that 50 volts would be subtracted from this by the action of the resistor 29, leaving an effective deflection voltage of 50 volts acting upon the deflector plate to swing the beam up above the top edge of the intercepter plate. However, any beam electrons in the tube 20 which strike the back plate 24 would pass through the resistor 30 on their return circuit to the cathode of the tube 20, and would cause a potential drop across the resistor 30, which tends to increase the negative bias on the grid 25*b* of the tube 25, cutting down the plate current through this tube and thus reducing the voltage drop across the resistor 29. Any reduction in voltage drop across this resistor results in a higher positive voltage being applied to the lower deflector plate 22*b*, this providing a restoring force tending to swing the beam downwardly. Conversely, if the beam strikes the plate 23 and returns directly to the tube cathode without passing through any portion of the amplifier circuit the beam moves upwardly as explained in the previous paragraph.

In each case the beam will move at a rate set by the time constant of a circuit including the deflection plate or vane capacity, which may be increased by external capacitance if necessary, and the resistance in the plate circuit of the control tube. With proper adjustment of the variables in the amplifier circuit and of the voltages involved there will then be only one stable beam position, which may be assumed as one in which the top edge of the intercepter plate 23 substantially bisects or intersects the beam area in such a way as to permit half of the electrons to be intercepted by the plate 23 and half of them to strike the rear plate 24.

Obviously, in practice, the amplifier circuit would be somewhat more complicated than that shown, and would properly be designed to prevent oscillations and to minimize hunting action. Under these conditions any slight movement of the beam from its equilibrium or stable position will cause the necessary restoring action to take place to hold the beam at the desired location. As will be readily apparent, any desired number of stable vertical positions for the beam may be provided by providing a corresponding number of upper edges (or effective intersecting edges) for the beam. The deflecting voltages provided by the amplifier may then be applied to the corresponding vertical deflecting arrangement in each of the slave tubes to cause similar stable vertical positioning of the beams in each of the slave tubes, for example.

Referring now more particularly to Fig. 4, a more complete control arrangement is illustrated and will be described, this comprising vertical and horizontal master tubes, a column positioner, and one slave tube, it being understood that as many additional slave tubes might be actuated as would be desired for the given application of my inventions. The vertical master tube, here indicated in general as 40, is shown as having a cathode 41, vertical deflection plates 42*a* and 42*b*, an intercepter plate 43 and a rear plate 44, these elements corresponding in function with the elements 21, 22, 23 and 24 of the tube 20 in the simplified diagram previously described. Differences in control action as a function of the portion of the electron beam striking the plate 43 or the plate 44 take place by virtue of actuation of an amplifier here indicated merely as a block 45, this amplifier acting in general in the manner previously described.

A vertical master tube here identified in general as 50 is also provided with a cathode indicated schematically as 51, with vertical deflection plates identified as 52*a* and 52*b*, and with intercepter and rear plates 53 and 54. The relative proportions of electrons in the beam striking the plates 53 and 54 act through an amplifier 55 to provide positioning control voltages effective on the deflector plates 52. Each of the master tubes 40 and 50 is provided in conventional manner with another pair of deflector plates, these being here identified as the deflector plates 46*a* and 46*b* in the one case and 56*a* and 56*b* in the other case. In the particular arrangement illustrated these act to provide horizontal control of the beam in each of the two master tubes. A column positioner here indicated by the block 47 is used to provide control voltages for the deflection plates 46 and 56 to control the horizontal or column position of the beam spot in connection with each of the intercepter arrangements in these two master control units.

One only of a plurality of slave tubes controlled by the masters is here illustrated, being identified in general as 60. This tube is a cathode ray device including a cathode 61 and vertical and horizontal deflection plates 62 and 66, respectively. At the right hand end of the tube, speaking with respect to the position as illustrated, is a target plate identified in general as 64, this comprising a rear layer or portion 64*a* of conducting metal on which is a layer 64*b* of insulating material, as for example a layer of barium oxide baked onto the front surface of the portion 64*a*. This storage or slave tube is shown in simplified manner as having 64 storage positions or storage areas. When storage areas are spoken of it will be understood that these are increments or portions of the total area of the target plate. The intercepter plates 43 and 53 in the two master tubes in this case have slots therein (of varying lengths for a purpose to be hereafter more fully described), providing upper positioning edges 43*a* to 43*h*, inclusive, in the one tube and 53*a* to 53*h*, inclusive, in the other tube. The upper edge of each tooth or section of the intercepter plate in each case provides a positioning edge, which, when the electron beam is partly intercepted thereby, stabilizes the position of the beam and acts through the associated amplifier to hold the beam at this position until some outside control influence, as a control pulse, causes movement of the beam position.

As the arrangement is illustrated in Fig. 4, the beam in the vertical master tube 40 is on the intercepter edge 43c, the third down from the top, causing precise positioning of the beam spot in the slave tube 60 in the third horizontal row from the top, speaking with respect to the rows of storage areas or storage positions. At the same time, as a result of actuating pulses received from the control unit, the beam or spot in the horizontal master 50 has been caused to assume a stable position intersected by the positioning edge 53e, this being fifth down from the top in this particular positioning unit. This results in positioning the beam in the slave tube 60 very precisely in the fifth position, counting from the left, in the third row, as illustrated. The precision positioning action, of course, is effected by interconnections between the control arrangements in the master tubes and those in the slave tubes. In the arrangement illustrated in Fig. 4 the deflector plates 42a and 42b are in parallel with the deflector plates 62a and 62b in the slave tube, resulting in precise vertical positioning in the vertical master 40 similarly precisely vertically positioning the beam in the slave tube 60. In an analogous manner the deflector plates 52a and 52b in the horizontal master tube 50 are connected to the horizontal deflecting plates 66a and 66b in the slave tube 60 to result in precise horizontal positioning of the beam in the slave tube. It is to be noted that the vertical and horizontal master tubes 40 and 50 are so designated because they respectively control the vertical and horizontal positioning of the beams in the slave tube 60, as the same is illustrated in Fig. 4, although insofar as the beam movement within the control tubes themselves is concerned, it will be noted that this is illustrated as vertical in both cases. All that is necessary is to connect the operating control plates of the master tube 50, the vertical ones in the case illustrated, in parallel with the horizontal control plate 66 of the slave tube 60, and to have the control characteristics of both similar. It is not at all necessary to have the beam positions move similarly in the vertical and horizontal masters and in the slave tubes.

The purpose of the different length slots in the plates 43 and 53 in the control tubes, and the manner in which actuating pulses from the control unit provide movement of the beam spot to the precise location desired in each case will now be described, reference being had more particularly to Fig. 5. This figure illustrates the vertical master 40 in association with the amplifier 45, and schematically indicates the way in which the spot moves to reach the position at which it is intersected by the positioning edge 43c of the intercepter comb in this vertical master. In Fig. 5 the amplifier associated with the vertical master 40 is illustrated as including not only the tube 25 and the circuit components 26 to 30 associated with it in Fig. 3, but also as including, in simplified form, a stepping circuit portion including a tube 70 of the gas-filled type, as for example tube type 884, and sssociated circuit connections and components. These are here illustrated as comprising a condenser 71, a source of plate voltage indicated as a B battery 72, a charge limiting resistor 73, and a discharge limiting resistor 74.

The pulse controlled portion of the amplifier circuit 45 receives actuating pulses at appropriate intervals, as may be best seen from Figure 6, through the lead 75 from the control unit. The condenser 71 normally stands charged and when a pulse is applied to the grid 70a the gas-filled tube is rendered conductive and discharges through the tube and the resistors 29 and 74. This provides a voltage drop across the resistor 29 sufficient suddenly to overcome the normal stabilizing action previously described and deflect the beam spot upwardly. Since the normal stabilizing control section of the amplifier 45 has an appreciable time constant, the brief voltage pulse existing across the resistor 29 causes the spot to move upward before the slower acting stabilizing portion comes into play. The charge in the condenser 71 should be such as to deflect the spot fully across the open space or slot in the intercepter plate and onto the plate again above such slot, but not substantially further. The time characteristic of the stabilizing portion of the amplifier, in taking over control of the spot, coordinates with the decay curve of the stepping voltage provided by discharge of the condenser 71 so that the spot is held up on the next "tooth" until the stabilizing amplifier takes over and causes the spot to move on upwardly to the next stable position provided by the next intersecting edge.

In Figure 6, portion 6a shows a plurality of synchronizing pulses furnished from some single synchronizing source to all the units of the computer requiring synchronization, with clearing pulses at the beginning and end of each cycle, as may be better seen in 6b. The position code delivered by the control unit for locating a given storage area is, in this particular example, 100111, with alternate digits providing the vertical position code, 101, as may be seen in 6d, and the other intermediate digits providing the horizontal position code 011, as illustrated in 6e, the "zero" digits being indicated by dotted lines, and the "one" digits by solid lines. In order to achieve a desired beam position without the necessity of going through a corresponding number of pulses when a large number of storage areas are provided, I make the slots in the intercepter plates of different lengths, as mentioned before, and provide column stepping pulses, as for example those indicated in 6f, for moving the beams in the master tubes between different operating paths.

Referring now more particularly to Figure 5 it will be seen that the slots providing the positioning edges 43d and 43h are of the greatest depth, those providing the positioning edges 43b and 43f of intermediate length, and the other slots of considerable lesser depth. This arrangement provides for three paths of vertical movement of the beam spot, or three "columns," as I am terming them, enabling a final position to be reached in a considerable lesser number of steps than would otherwise be possible, particularly where the small 8 x 8 arrangement illustrated for simplicity of description is replaced by a 64 x 64 or greater storage area arrangement, as would be the case in practice.

Assuming the spot to be in the initial position 48a illustrated in dotted lines in Figure 5, the starting position for the spot at the commencement of each cycle, the first vertical positioning code pulse, occurring in the first digit position as illustrated in 6d, would disturb the equilibrium of the spot and move it to the plate above the slot, causing it to then move on up to the position 48b. Passing the matter of the horizontal position code for the time being, the next thing occurring that would affect the vertical master 40 is a column stepping pulse, the first one to the left illustrated in 6f, this pulse causing movement of the spot to the right one column to the position 48c. The spot would remain here through a predetermined time interval without being affected or moved, since the next digit position in the vertical position code illustrated in 6d is zero. Thereupon the second column stepping pulse would cause the spot to move to the position 48d. The next vertical position code digit being a one, an actual pulse would come up the lead 75 and cause the spot to move up to the next higher stable position, in this case 48e, where it would rest.

Meanwhile, in analogous manner, the spot in the horizontal master tube 50, reference now being had to Figure 4, would not have been moved while it was in the first column position, since the first horizontal position code digit is a zero, but would have been moved one column to the right and then stepped up to the positioning edge 53f, to thereafter be moved another column to the right and stepped up once more to the final spot position illustrated in solid lines in Figure 4. These positioning operations of the spots in the vertical and horizontal masters would be accomplished by having the column positioning pulses affect both master tubes and the positioning code impulses affect first one master and then the other by appropriate intermediate electronic switching (effected in the control unit) between the amplifiers 45 and 55.

The bringing of the beam spots to the desired stable positions heretofore described in the vertical and horizontal masters would cause similar deflecting voltages to be applied to the slave tubes and to bring the spots therein to similar target areas, as that illustrated in the tube 60, with precision and with compensation for variations which would otherwise cause error. Writing or reading might then be effected at this spot point, as called for by the control unit, and thereafter the beams would be returned to initial position. For example, referring more particularly to Figure 5, another column stepping pulse might move the vertical spot from the position **48*e* to the clearing column to the right, initially to the position 48*f*, where it would then drift on down to the position 48*g*. Thereupon the column deflecting arrangement would be reversed as to polarity by column clearing pulses and the spot caused to move back to the initial or starting position 48*a***, where the system would again be conditioned for operation as initially described.

The column positioner indicated in Figures 4 and 5 diagrammatically in block form can be precisely controlled by apparatus analogous to that just described for use as vertical and horizontal masters, or by a circuit designed for this purpose. Referring first to the former, an arrangement of this type is illustrated in Figure 7. A column positioning tube 80 is shown diagrammatically as having a cathode 81 and vertical and horizontal deflecting arrangements 82 and 86. An intercepter plate 83 and a rear plate 84 are again placed at the target end of the tube, and connected to an amplifier 85 analogous to that illustrated in simplified form in Figure 5. In this case the initial position of the spot **88*a* would correspond, in so far as column position is concerned, with the initial position 48*a* in Figure 5. The column stepping pulses in this case operate upon the deflecting arrangements shown as the horizontal deflection plates 86, and the first column stepping pulse would cause the beam spot in the column control tube 80 to move to the position 88*b*, causing similar horizontal deflection of the spots in the vertical and horizontal tubes. This would be followed by movement of the spot to the third column position shown in solid lines as 88*c*. Subsequently the column clearing pulses would cause the beam spot in the column positioner tube 80 to move to the position 88*d* and then a clearing pulse would swing the spot up to the position 88*e*, whereupon it would move back to the left to the initial column position and thereupon, by an appropriate pulse, be returned to its initial position 88*a*. No careful control of the voltages causing the vertical movement of the spot in the positioner tube 80 is necessary, as considerable differences in its vertical position will make no difference in the accuracy of the device so long as the spot stays on the teeth of the intercepter plate 83** during column stepping action and, on its return movement to the left, misses the ends of the short teeth but does not miss the longer initial tooth.

This vertical movement of the spot in the particular form of positioner shown in Figure 7 may be very readily achieved by a control amplifier identified in general as 89 and shown in circuit diagram form in Figure 8. The circuit shown in this figure is known in the art as an Eccles-Jordan or flip-flop circuit. This particular circuit includes a dual triode tube 90, which may be of tube type 6SN7, and and amplifier tube 91, which may be a 6J5, for example, providing the vertical deflection voltage for the plates 82 of the column positioning tube 80 illustrated in Figure 7.

The grid of the first or left hand triode section of the tube 90, referring to the position of the elements in Figure 8, is connected to the plate of the right hand or second triode section through a network comprising the resistor 92 and condenser 93. Similarly, the anode of the first triode section is connected through a network comprising the resistor 94 and condenser 95 to the grid of the other section. The cathodes of both sections may be grounded and the plates supplied with anode potential through suitable plate resistors as illustrated. Control pulses, negative with respect to ground, would be supplied from the control unit through the lead 96.

If it be assumed that the first triode section has a space current flowing therethrough, the potential applied through the network comprising the elements 94 and 95 to the grid of the second or right hand section of the tube 90 will result in this latter section being biased to cut-off. Under these conditions, if a negative pulse be applied through the lead 96 it will be impressed upon the condensers 97 and 98, but since the right hand section is already cut off it will have no effect upon this section but it will reduce the space current in the left hand section. This reduction in space current will make the plate potential of the left hand section more positive, and this positive swing will be reflected through the coupling network to the grid of the right hand section which will cause this section to become conductive. As this right hand section starts to conduct its plate will swing more negative and this change in voltage will be applied through the coupling network to the grid of the left hand section, tending to cause the space current in this section to be still further reduced, this action continuing until the left hand section is completely blocked or cut off and the right hand section is fully conductive. The effective plate potential of the right hand section is applied through the coupling resistor 99 to the grid of the tube 91, and since this plate potential is at either one or the other of two values because of this section being either conducting or nonconducting, this difference in potential (amplified by the tube 91), is applied to the deflection plates 82 to achieve the desired vertical movement of the beam spot in the column positioner previously described.

Since the column positioning voltages for the vertical and horizontal masters is not critical, it being sufficient if the path of movement of the beam spots in these masters lies within certain limits, the particular control arrangement illustrated in Figure 7 may if desired be replaced by a circuit of the character illustrated in Figure 9, for example. In this circuit there are a pair of successive flip-flop arrangements, here shown as employing the tubes 101 and 102, which may for example be of tube type 6SN7, coupled by a diode 103. The right hand one of the two similiar circuits is coupled into an amplifier tube 104 which may directly supply the column positioning or horizontal deflection voltages to the master tubes, as for example to the plates **46*a* and 46*b* of the vertical master 40**.

In the circuit illustrated in Figure 9 the left and right hand sections of the tube 101 again have their plates coupled to the grid of the opposite section through networks comprising the resistance 105 and condenser 106 in one case and resistor 107 and condenser 108 in the other. Similarly, the plate voltages of the left and right hand sections of tube 102 are coupled back to the grids of the opposite sections through networks comprising resistor 109 and condenser 110 on the one hand and resistor 111 and condenser 112 on the other hand. A negative pulse supplied to the first section through the lead 113 from the control unit causes the sections of this first portion of the circuit to alternate between conducting and non-conducting condition in the manner described in connection with Figure 8. When the plate of the right hand section of tube 101 is swinging negative this voltage change passes through the diode 103 to provide a control pulse operative upon the grids of the tube 102, to cause a similar alternating action in this tube. The grid potential of the amplifier tube 104, and thus the deflection potential in the master tube 40, is a function of the plate voltages of the right hand sections of each of the two dual tubes, the plate voltage variations in the right hand section of the tube 101 being applied to the grid of the tube 104 through the lead 114, and the plate voltage changes in the right hand section of tube 102 being applied to this same grid through the lead 115, both voltages being developed across the same coupling resistor. The associated plate supply resistors are preferably so chosen that the plate voltages of these two right hand sections differ, with the second being approximately double that of the first when such sections are both conducting.

Referring now more particularly to Figure 10, the manner in which this enables provisions of column positioning voltages to the horizontal deflection plates of the master tubes 40 and 50 will be readily apparent. When the right hand sections of tubes 101 and 102 are both conducting their plate voltages would be most negative, and the application of the output of the tube 104 to the deflector plates (with proper polarity) would result in the beam spot being farthest to the left, or in the first column position, in the control tubes 40 and 50, this being represented as the voltage level 120 in Figure 10. A pulse from the control unit applied through the lead 113 would then cause the sections of the tube 101 to reverse their operation, with the left hand section becoming conductive and the right hand section non-conductive. Since the plate of the right hand section swings more positive during this change there would be no control pulse sent through the diode 103 to the second portion of the circuit. However, the positive swing of the plate of the right hand section of the tube 101 would make the grid of the tube 104 more positive, resulting in an effective deflection voltage level indicated as 121 in Figure 10. The next negative pulse through the lead 113 from the control unit would cause a reversal of operation in the tube 101, and since the plate of the second section becomes more negative in potential as this section becomes conductive a pulse would be transmitted through the diode 103 to the grids of the tube 102. The result of this next control impulse from the control unit, therefore, would be to render the right hand section of tube 101 again conducting and at the same time to render the left hand section of the tube 102 conducting. If it be assumed that the plate potential of the right hand section of tube 102 is higher than that of tube 101 when these sections are non-conducting, the voltage applied to the grid of the tube 104 would be more positive and the resultant horizontal deflection voltage applied to the plates 46 of the tube 40, for example, would then be represented by the level 122 of Figure 10. The receipt of another pulse through the lead 113 from the control unit would leave the sections of the tube 102 unchanged, but would cause a reversal of operation in the tube 101, resulting in an additive effect giving a deflection voltage level indicated as 123 in Figure 10. The next pulse from the control unit would affect not only tube 101, but would also cause action through the diode 103 and reversal of operation in tube 102, resulting in the deflection voltage dropping back to the initial level, as the level indicated in Figure 10 as 120'. Successive pulses would then again cause the horizontal deflection voltages or column positioning voltages to again move through the same positioning levels, these successive levels being indicated in Figure 10 as 121', 122' and 123'.

While the positioning arrangements shown in the master tubes heretofore described comprise only a single intercepter plate or comb, great stability and certainty of stepping operation between stable positions may if desired be affected by the use of two intercepter plates or combs with their teeth meshed or interlaced. Such an arrangement is shown in Figure 11, where two intercepter plates or combs 132 and 133 lie in the same plane in front of a plate 134, being adapted to intercept all or part of the electrons of a ray beam directed toward the plate 134 at the target end of a tube similar to those previously illustrated. Here the teeth of the comb 132, having upper positioning edges respectively identified as **132*a* to 132*e* are interleaved with the oppositely projecting teeth of the comb 133, the upper edges of which are here identified as 133*a* to 133*d*, inclusive. The two combs are illustrated as connected respectively to the two movable elements of a double-throw double-pole switch here identified in general as 135, it being understood that in practice electronic rather than mechanical switching would preferably be employed. If the movable elements of this switch, here identified as 135*a* and 135*b*, are connected to the contacts shown to the left in Figure 11 the comb 133 is grounded to act as an intercepter and the comb 132 is connected to the plate 134 to be connected, with this latter plate, to the grid of the tube 136 to provide an actuating voltage thereon by reason of current flow to ground through the resistor 137. Any electrons striking intercepter 132 or plate 134 act to reduce the space current through the tube 136 and the change in plate current flow through the resistor 138 might then act to change the deflection plate voltage supplied by the lead 139 in such manner as to tend to cause the beam to move downwardly. With such an arrangement, for example, the beam would remain stable at the top position, intersected by the edge 132*a*, so long as this left hand comb were grounded. As soon as the switch was thrown, however, the beam would move downwardly until a substantial portion of its electrons were intercepted by the uppermost tooth of the comb 133, resulting in a second stable position with the beam intersected by the edge 133*a*. Another reversal of connections would cause the beam to move downwardly until it was intersected by the edge 132*b***, and its position stabilized at this point, and so forth. This arrangement provides a positive positioning which is accomplished by the switching between the two intercepter plates and is independent of such factors as the time constant of the stabilizing circuit, the strength of the stepping pulse provided by a condenser discharge, or other variables.

While all operations have heretofore been described as resulting from direct electronic impingement upon a target plate, it will be understood that control action can be effected or augmented by secondary emission where desired. Figure 12, for example, illustrates a tube 150 having a cathode 151 and vertical and horizontal deflection plates 152 and 156, respectively. An intercepter plate 153 lies in front of a target plate 154, these parts all being analogous in function to those in the master tube 50 described in Figure 4, but with reference numerals 100 higher. Between the plates 153 and 154, however, is a mesh or grid 158. If the material of the plate 154 has a high secondary emission characteristic such electrons of the ray beam as pass by the intercepter plate 153 and strike the plate 154 will cause a release of a substantial number of electrons by secondary emission. If the screen 158 has the proper potential relative to the plate 154 these secondary emission electrons will be attracted to this screen and provide a substantial current flow through the lead 159 which may be used for the control function. It should also be understood, of course, that while all of the tubes or cathode ray devices illustrated throughout the drawings are shown without electron attracting means for simplicity of illustration, all would be provided with a positively charged grid or screen, which might be ahead of the intercepter or between it and the rear plate, which would provide the attracting potential causing the electrons to flow from the cathode toward the target end of the tube.

It is also to be understood that while I have shown only a relatively small number of slave or storage devices of the cathode ray type in the memory unit, with these directly connected in parallel with each other, I prefer to provide a transmission line effect when a large number of slave tubes are used, as the forty or more which would normally be used in one section of a memory unit in an electronic computer of the kind with which I am here concerned. If a certain amount of effective inductance is provided in series in one lead between each of the cathode ray devices there is, with the vane capacitance of the tubes all in parallel across the leads, what is in effect a transmission line down which the deflection control voltages or impulses travel. With such an arrangement the beam spots in the master tubes may be stepped from position to position during beam location in each cycle of operation without waiting for all of the slave tube beam spots to come to the same position, it then only being necessary, after spot location in the master tubes, to wait a suitable period (as two or three synchronizing pulses) before reading or writing is effected. This enables much higher speed of operation, with a delay or waiting period only once during each cycle of operation instead of between each stepping action.

The provision of an effective transmission line as a connection transmitting the controlled deflecting energy from the control amplifier to the deflecting means in the storage tubes enables the positioning pulses to be handled rapidly in the control arrangement. After proper location of the beam spot in the storage tubes reading or writing is preferably effected by the same electron beam in order to insure certainty of tracking. Methods of doing this, and of maintaining the stored voltages, either by an independent "holding" beam or preferably by a "spray" of electrons, are known to the art and will not be gone into here. If the same beam is used for both reading and writing the cathodes of the memory tubes must be biased to different voltages during different operations, and the master or control tubes should have the same voltages on them at all times as those existing in the slave tubes. However, so long as the electrode geometries are substantially identical in the different tubes, and the tubes are designed to provide beam locating operation in the masters under considerable differences in cathode potential, no real difficulties will be encountered in operation.

It is also to be understood that, while the column positioner has been illustrated and described as separate from the vertical and horizontal masters, it is fully feasible to incorporate the column positioning function in one of the master tubes. The vertical master may, for example, be provided with not only the intercepter plate shown therein in Figure 4, but with another intercepter plate with vertical teeth, with the control voltage derived from this latter plate being used for column positioning for both tubes. At certain locations the tooth of one intercepter plate would then partly cover the tooth of the other intercepter plate, but proper proportioning of the time constants of the two amplifiers used for vertical and column control functions enables movements of the spot in one direction to be made across a tooth without loss of control in the other direction. Normally I would prefer to locate the broader toothed column positioning control plate behind the narrower toothed vertical positioning control plate. If the time constant of the horizontal control amplifier is then made considerably longer than that of the vertical control amplifier a vertical step of the beam can be made without losing horizontal or column control.

Other positioning interlocks between this last mentioned type of positioning control, or those illustrated and described in Figures 1 to 8, may be employed if desired. For example, the vertical master tube may be used to control the vertical position of the beam spot in the column positioner tube at the same time that the control action of this latter tube is determining the column positioning of the beam in the vertical master tube.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Electronic apparatus of the character described, including: a plurality of cathode ray devices each having a plurality of operative target areas; a cathode ray device having a first control function; a cathode ray device having a second control function; and electronic apparatus actuated by and in accordance with the positions of the ray beams in each of the control devices for precisely locating the ray beam in a stationary position on a desired target area in each of the operative devices.

2. In a computer, apparatus for electronically storing and reproducing information comprising: a plurality of cathode ray devices each having a plurality of electron storage areas; a cathode ray device having a first control function; a cathode ray device having a second control function; and electronic apparatus actuated by and in accordance with the positions of the ray beams in each of the control devices for precisely locating the ray beam on a desired similar storage area in each of the storage devices.

3. Apparatus of the character claimed in claim 2, wherein each control device includes a conductive member adapted to be at least partly impinged upon by said ray beam for providing a control signal current which is a function of the beam position, and wherein means are provided for amplifying the control signal current and actuating beam deflecting means thereby to provide stable operation.

4. Electronic apparatus of the character described including: a cathode ray device having a plurality of operative target areas; a cathode ray device having a control function; and electronic apparatus actuated by and in accordance with the position of the ray beam in the last mentioned device for precisely positioning the ray beam in a stationary position in the first mentioned device, the cathode ray control device including a conductive plate member providing a plurality of spaced positioning edge portions, each such edge portion being adapted to be at least partly impinged upon by said ray beam for providing a control current actuating a deflecting arrangement for the beam for providing a stable position for a beam intersected by an edge portion.

5. Apparatus of the character claimed in claim 2, wherein each control device includes a conductive plate member providing a plurality of spaced positioning edge portions, each such edge portion being adapted to be at least partly impinged upon by said ray beam for providing a control current actuating a deflecting arrangement for the beam for providing a stable position for a beam intersected by an edge portion.

6. Electronic apparatus of the character described, including: a plurality of cathode ray devices each having horizontal and vertical beam-deflecting arrangements and a plurality of operative target areas; a cathode ray device having a first control function; a cathode ray device having a second control function, each control device including a plate member providing a plurality of spaced positioning edge portions, each such edge portion providing a stable position for a beam intersected thereby; and electronic apparatus actuated by and in accordance with the positions of the ray beams in each of the control devices for precisely locating the ray beam on a desired target area in each of the operative devices, one control device providing control for all of the horizontal deflecting arrangements in all of the operative devices and the other control device providing control for all of the vertical deflecting arrangements.

7. Electronic apparatus of the character described, including: a cathode ray device having means for providing a ray beam, deflecting means for moving said beam in a certain direction, and a conductive member having a plurality of spaced positioning edges of different length intersecting the path of movement of said beam and adapted to be at least partly impinged upon by said ray beam to provide a control voltage as a function of a position of said beam with respect to one of said edges; and an amplifier having its input connected to said conductive member and actuated by said control voltage and having its output connected to and energizing said deflecting means.

8. Electronic apparatus of the character described, including: a plurality of cathode ray devices each having deflecting means and a plurality of operative electron storage areas; a cathode ray device having a control function, this device having means for providing a ray beam, deflecting means for moving said beam in a certain direction, and a conductive member having a plurality of spaced positioning edges of different length intersecting the path of movement of said beam and adapted to be at least partly impinged upon by said ray beam to provide a control voltage as a function of a position of said beam with respect to one of said edges; and an amplifier having its input connected to said conductive member and actuated by said control voltage and having its output connected to and energizing said deflecting means in each of said first mentioned cathode ray devices.

9. Electronic apparatus of the character described, including: a cathode ray device having means for providing a ray beam, first deflecting means for moving said beam in a certain direction, second deflecting means for moving said beam in another direction normal to said first mentioned direction, and a conductive member having a plurality of spaced positioning edges of different length all intersecting at least one path of movement of said beam in said first direction and adapted to be at least partly impinged upon by said ray beam to provide a control voltage as a function of a position of said beam with respect to one of said edges; and an amplifier having its output connected to said first deflecting means and its input connected to said conductive member to be actuated by said control voltage for energizing said deflecting means.

10. Electronic apparatus of the character described, including: a cathode ray device having means for providing a ray beam, first deflecting means for moving said beam in a certain direction, second deflecting means for moving said beam in another direction normal to said first mentioned direction to provide a plurality of paths of movement in said first direction, and a member having a plurality of spaced positioning edges of different length all intersecting at least one path of movement of said beam in said first direction and adapted to provide a control voltage as a function of a position of said beam with respect to one of said edges, only certain of said edges intersecting another path of movement of said beam in said first direction; and an amplifier actuated by said control voltage for energizing said deflecting means.

11. Electronic apparatus of the character described, including: a cathode ray device having means for providing a ray beam, first deflecting means for moving said beam in a certain direction, second deflecting means for moving said beam in another direction normal to said first mentioned direction to provide a plurality of paths of movement in said first direction, and a member having a plurality of spaced positioning edges of different length all intersecting at least one path of movement of said beam in said first direction and adapted to provide a control voltage as a function of a position of said beam with respect to one of said edges, only certain of said edges intersecting another path of movement of said beam in said first direction and a smaller number of said edges intersecting still another path of movement of said beam in said first direction; and an amplifier actuated by said control voltage for energizing said deflecting means.

12. Electronic apparatus of the character described, including: a cathode ray device having means for providing a ray beam, deflecting means for moving said beam in a certain direction, and interceptor means providing a plurality of generally parallel spaced positioning edges of different length intersecting the path of movement of said beam and adapted to be at least partly impinged upon by said ray beam to provide a control voltage as a function of a position of said beam with respect to one of said edges; and an amplifier actuated by said control voltage and having its output connected to and energizing said deflecting means.

13. Electronic apparatus of the character described, including: a plurality of cathode ray devices each having a plurality of operative target areas; a cathode ray device having a control function; means for moving the ray beam in the control device in steps to a desired location; and electronic apparatus actuated by and in accordance with the position of the ray beam in the control device and connected to said first mentioned cathode ray devices for precisely positioning the ray beam in each of the operative devices, the connection between this last mentioned apparatus and the operative devices having transmission line characteristics.

14. Electronic apparatus of the character described, including: a plurality of cathode ray devices each having a plurality of operative target areas; a cathode ray device having a control function, this device having means for providing a ray beam, deflecting means for moving said beam in a certain direction, and a member having a plurality of spaced positioning edges intersecting the path of movement of said beam and adapted to be at least partly impinged upon by said ray beam to provide a control voltage as a function of a position of said beam; means for moving the ray beam in the control device in steps to a desired stationary location; and an amplifier actuated by said control voltage connected to and energizing the deflecting means in each of the operative tubes, the connection between the amplifier and the last mentioned deflecting means including reactance of a character opposite to that of the deflecting means to provide transmission line characteristics.

15. A memory device comprising information storage means comprising a charge retaining surface, means for storing information on said storage means, and means for directing said storing means to a particular storage position comprising an electron discharge device having a source of electrons and an electrode, and means for directing electrons from said source to a position on said electrode corresponding to said particular storage position, said electron directing means being functionally related to said storing means directing means.

16. A memory device comprising information storage means comprising a charge retaining surface, means for storing information on said storage means, and means for directing said storing means to a particular storage position comprising an electron discharge device having a source of electrons and an electrode, means for forming said electrons into a sharply defined beam, means for directing said electron beam to various positions on said electrode, and means for controlling said electron beam and said means for directing said storing means in response to the output from said electrode.

17. A memory device comprising an electron discharge device having a source of electrons and a storage plate, means to direct said electrons to particular positions on said plate to store thereon charges representative of information comprising a second electron discharge device having a source of electrons and an electrode, means for directing said electrons toward said electrode, and means for simultaneously controlling the electron directing means in both said electron discharge devices.

18. A memory device comprising an electron discharge device having a source of electrons and a storage plate having a homogeneous surface, means to direct said electrons to particular positions on said plate to store charges representative of information comprising a second electron discharge device having a source of electrons and an electrode, means for directing said electrons toward said electrode, and means for simultaneously controlling the electron directing means in both said electron discharge devices in response to output signals from said second electron discharge device.

References Cited in the file of this patent

UNITED STATES PATENTS

| | | |
|---|---|---|
| 2,107,410 | Dreyer | Feb. 8, 1938 |
| 2,130,134 | Iams | Sept. 13, 1938 |
| 2,287,296 | Dallos | June 23, 1942 |
| 2,302,311 | Goldsmith | Nov. 17, 1942 |
| 2,358,902 | Ziebolz | Sept. 26, 1944 |
| 2,374,666 | Cunniff | May 1, 1945 |
| 2,398,552 | Norton | Apr. 16, 1946 |
| 2,404,106 | Snyder | July 16, 1946 |
| 2,417,450 | Sears | Mar. 18, 1947 |
| 2,441,296 | Snyder et al. | May 11, 1948 |
| 2,451,484 | Gould et al. | Oct. 19, 1948 |
| 2,457,911 | Munster | Jan. 4, 1949 |
| 2,472,779 | Selgin | June 7, 1949 |
| 2,527,712 | Dicke | Oct. 31, 1950 |
| 2,540,016 | Sunstein | Jan. 30, 1951 |
| 2,681,424 | Hergenrother | June 15, 1954 |

Notice of Adverse Decision in Interference

In Interference No. 88,342 involving Patent No. 2,750,532, A. L. Samuel, Cathode-ray devices, particularly for electronic computers, final judgment adverse to the patentee was rendered November 14, 1957, as to claims 13, 15, and 16.

[*Official Gazette March 4, 1958.*]